P. Mougey.
Railroad Gate.
N°. 77,642. Patented May 5, 1868.
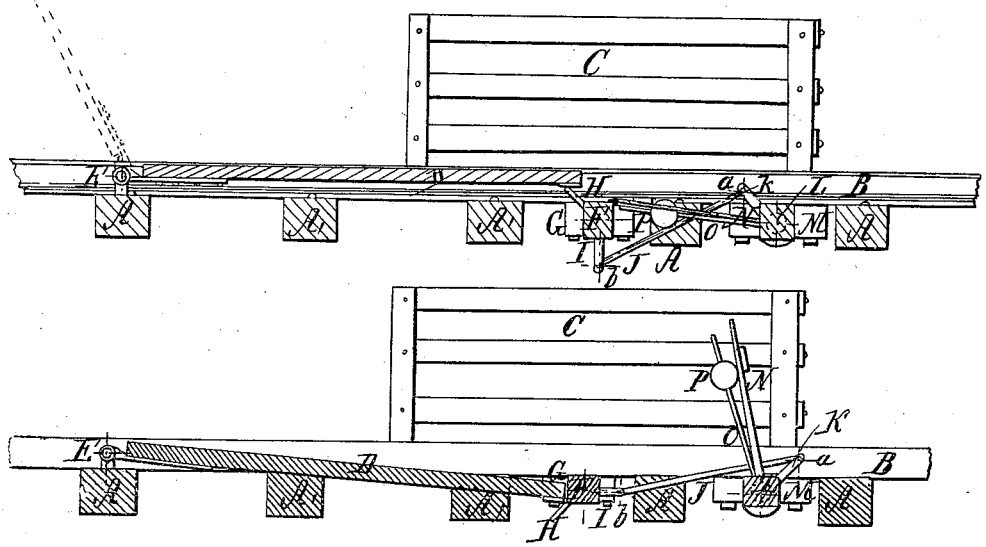
Fig. 1.
Fig. 2.
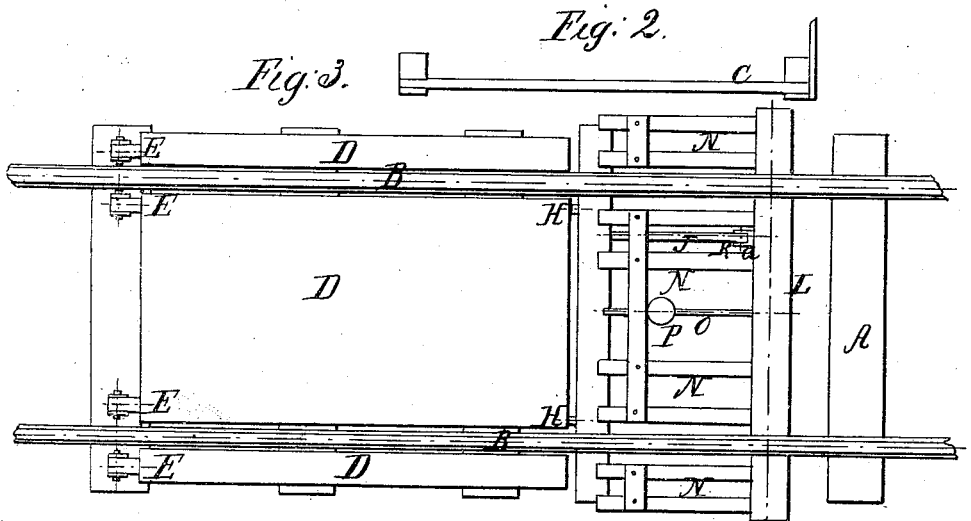
Fig. 3.
Witnesses:
Rush K. Abbott
Edw. A. Bieloud
Inventor:
Peter Mougey
BY Job Abbott

United States Patent Office.

PETER MOUGEY, OF MARSHALLSVILLE, OHIO.

Letters Patent No. 77,642, dated May 5, 1868.

---

IMPROVED RAILWAY CATTLE-GUARD.

---

The Schedule referred to in these Letters Patent and making part of the same.

---

TO ALL WHOM IT MAY CONCERN:

Be it known that I, PETER MOUGEY, of Marshallsville, in the county of Wayne, and State of Ohio, have invented a new and useful Cattle-Guard for Railroads; and I do hereby declare that the following is a full, clear, and exact description of my invention, reference being had to the accompanying drawings, forming a part of this specification, and to the letters of reference marked thereon, of which drawings—

Figure 1 is a sectional side view of my cattle-guard.

Figure 2 is another sectional side view of the same, showing the gate in a different position.

Figure 3 is a plan of my cattle-guard, the gate being in the position shown in fig. 1.

The nature of my invention consists in the combination of a rotating gate and movable platform, which are so arranged that the gate lies down flat, and is not acted on by and affords no obstruction to any passing train; but when any cattle attempt to walk up the track, their weight on the movable platforms causes the gate to assume an erect position, which prevents their going up, said erect position of the gate being maintained until the cattle step off from the movable platforms, when the gate assumes its original flat position.

To enable others skilled in the art to make and use my invention, I will proceed to describe its construction and operation.

The ties A A have the rails B B laid on them, as shown, and in one of these ties is driven one side of the hinges E, as shown, the other side of said hinge being secured to the movable platforms D D D, the said hinge serving to support the end of the platform, and to allow of a motion of said platform.

A rock-shaft, F, is hung in boxes G G under the rails B B, and has the arms H H, which rest under and support the end of the platforms D D, as shown.

Another arm, I, is secured in said rock-shaft, and has the connecting-rod J attached to it by a bolt, b.

The gate-shaft L is hung in boxes M M under the rails B B, and has an arm, K, inserted in it, which is attached to the connecting-rod J by a bolt, a.

The slats N N, which form the gate, are mortised into the gate-shaft L, or bolted thereto, and are connected by cross-pieces, as shown.

A weight-rod, O, is inserted in the gate-shaft L, and has a weight, P, on it, which can be moved up and down, and thus regulate the weight which is required to turn the gate up.

The fences C C, at the sides of the track, come up close to the ends of the gate L N, and form with said gate a complete barrier to any cattle which attempt to pass up the track.

The operation of my cattle-guard is readily seen.

The ordinary position of the gate is that shown in fig. 1, where it is represented as lying down flat, and out of the way of passing trains.

If any cattle attempt to pass up the track, they will be compelled to step on the platforms D D in order to do so. As soon as they step on these platforms, their weight forces the platforms down to the position shown in fig. 2, the ties A A being cut away to allow of this movement of said platforms.

This motion of the platforms causes the rock-shaft to rotate by action of the arms H H, and through the action of the arms I and K, and the connecting-rod J, causes the gate L N to assume the erect position shown in fig. 2.

As soon as the cattle step off from the platforms D D, the action of the adjustable weight P causes the gate to fall down to its original position.

By moving the weight P up and down on the rod O, the amount of weight required on the platforms D D to raise the gate L N may be regulated to suit the weight of any animal which it is desired to prevent going up the track.

Having thus fully described my invention, what I claim as new, and desire to secure by Letters Patent, is—

The peculiar arrangement and combination of the platforms D D D, rock-shaft F, with arms H H and I, connecting-rod J, arm K, and gate L N, the several parts being arranged substantially in the manner and for the purpose herein specified.

As evidence that I claim the foregoing, I have hereunto set my hand, this 28th day of February, A. D. 1868.

PETER MOUGEY.

Witnesses:
HENRY WINGER,
RICHARD HARRIS.